United States Patent [19]

Ozawa et al.

[11] Patent Number: 5,280,373
[45] Date of Patent: Jan. 18, 1994

[54] LIGHT MODULATING DEVICE INCLUDING A LIQUID CRYSTAL, A POLYMER AND DICHROIC DYES HAVING MAXIMUM ABSORPTION IN THE DIFFERENT WAVELENGTH REGIONS

[75] Inventors: Tetsuo Ozawa, Kanagawa; Noriyuki Okabe, Miyagi, both of Japan

[73] Assignee: Mitsubishi Kasei Corporation, Tokyo, Japan

[21] Appl. No.: 917,940

[22] Filed: Jul. 24, 1992

[30] Foreign Application Priority Data

Jul. 24, 1991 [JP] Japan ................................. 3-184645
Jul. 24, 1991 [JP] Japan ................................. 3-184647

[51] Int. Cl.⁵ .............................................. G02F 1/133
[52] U.S. Cl. .................................. 359/51; 359/96; 359/70
[58] Field of Search ................. 359/51, 52, 96, 93

[56] References Cited

U.S. PATENT DOCUMENTS 4,749,261 6/1988 McLaughlin et al. ............... 359/51
4,818,070 4/1989 Gunjima et al. .................. 359/93 X

FOREIGN PATENT DOCUMENTS 0103126 5/1986 Japan ................................. 359/96
2226174 6/1990 United Kingdom ................ 359/96

*Primary Examiner*—William L. Sikes
*Assistant Examiner*—Huy Mai
*Attorney, Agent, or Firm*—Sughrue, Mion, Zinn, Macpeak & Seas

[57] ABSTRACT

A light modulating device comprising a pair of electrode substrates having supported therebetween an electrically light modulating material containing a liquid crystal and a polymer, in which said light modulating material further contains (1) a combination of a dichroic dye having a maximum absorption in the wavelength region of from 400 to 489 nm, a dichroic dye having a maximum absorption in the wavelength region of from 490 to 559 nm, and a dichroic dye having a maximum absorption in the wavelength region of from 560 to 699 nm and/or (2) a near infrared- to infrared-absorbing dichroic dye having a maximum absorption in the wavelength region of 700 nm or more. The light modulating device exhibits high performance in controlling transmission of visible to infrared light and a high contrast between "on" and "off" states.

6 Claims, 1 Drawing Sheet

LIGHT MODULATING DEVICE INCLUDING A LIQUID CRYSTAL, A POLYMER AND DICHROIC DYES HAVING MAXIMUM ABSORPTION IN THE DIFFERENT WAVELENGTH REGIONS

FIELD OF THE INVENTION

This invention relates to a light modulating device and more particularly to a light modulating device which is capable of controlling transmission of near infrared to infrared light as well as visible light and also makes a high contrast between "on" and "off" states.

BACKGROUND OF THE INVENTION

A light modulating material (hereinafter sometimes referred to as "light controlling material") comprising a liquid crystal and a supporting polymer shows an opaque state in the absence of an electric field ("off" state) because incident light is scattered therein due to a difference in refractive index between the polymer matrix and the liquid crystal, a spatial distortion of the liquid crystal director, discontinuity of the liquid crystal director among liquid crystal domains, and the like. In the presence of an electric field, the liquid crystal molecules are aligned in the direction of the electric field so that the refractive index of the liquid crystal becomes approximate to that of the polymer matrix to show a transparent state ("on" state). The "off" and "on" states occur reversibly.

Light modulating devices utilizing such optical properties are disclosed, e.g., in JP-A-64-62615 (the term "JP-A" as used herein means an "unexamined published Japanese patent application") and U.S. Pat. No. 4,435,047.

However, since the light modulating devices disclosed in the above publications usually assume white while in an opaque state, they are capable of controlling transmission of visible light to some extent but hardly capable of controlling transmission of longer wavelength light, especially near infrared to infrared light. Besides, the element disclosed in U.S. Pat. No. 4,435,047, which achieves displaying or light control by making use of changes of the liquid crystal state caused by a difference in temperature, is different from those utilizing application of an electrical field.

Near infrared to infrared light is heat rays and forms about 50% of sunlight. A light modulating device has been expected to control transmission of sunlight for making the atmosphere in the rooms and vehicles more comfortable. From this viewpoint, the above-described known light modulating devices fail to sufficiently serve for expected functions because of the poor control on near infrared to infrared light.

U.S. Pat. No. 4,707,080 discloses a light modulating device using a liquid crystal material containing two kinds of dichroic dyes, a black dye and a magenta dye. However, use of only two kinds of dichroic dyes as disclosed has a limit of capability in controlling color density, tone, and transmission of light inclusive of near infrared to infrared light.

On the other hand, when used as a display, etc., a light modulating device is required to exhibit appreciable light screening properties in the absence of an electric field and appreciable light transmitting properties in the presence of an electric field, that is, to make a high contrast between "off" and "on" states. Under the present situation, a sufficiently high contrast has not yet been achieved with any of the known light modulating devices, inclusive of the above-described elements containing two kinds of dichroic dyes as well as those containing no dichroic dye.

Further, it has been proposed to form an infrared light reflecting film made of, e.g., gold or $Ti_2O/Ag/Ti_2O$, on a light modulating device thereby to reduce infrared light energy as disclosed in U.S. Pat. No. 4,749,261 and JP-A-2-289782. This means being taken singly, it follows that the light modulating device always reflects infrared light, failing to control transmission of infrared light. If the infrared reflecting film is made thicker, transmission of light rays other than near infrared to infrared rays is also reduced, resulting in a reduction of total transmission. If the reflecting film is made thinner, on the other hand, the effect of infrared reflection would be lessened.

SUMMARY OF THE INVENTION

An object of the present invention is to provide a light modulating device which is capable of controlling transmission of near infrared to infrared light as well as visible light and also makes a high contrast between "on" and "off" states.

Other objects and effects of the present invention will be apparent from the following description.

The above objects of the present invention are accomplished by using a light modulating material (light controlling material), containing, in addition to a liquid crystal and a polymer, three kinds of dichroic dyes different in maximum absorption wavelength within a range of from 400 to 699 nm and/or a near infrared- to infrared-absorbing dichroic dye having a maximum absorption wavelength of 700 nm or longer.

The present invention provides, as a first aspect, a light modulating device comprising a pair of substrates each having an electrode on the inner side thereof and having supported therebetween a light modulating material for controlling light transmission and scattering through voltage application, the light modulating material comprising a liquid crystal, a polymer, a dichroic dye having a maximum absorption in the wavelength region of from 400 to 489 nm, a dichroic dye having a maximum absorption in the wavelength region of from 490 to 559 nm, and a dichroic dye having a maximum absorption in the wavelength region of from 560 to 699 nm.

The present invention also provides, as a second aspect, a light modulating device comprising a pair of substrates each having an electrode on the inner side thereof and having supported therebetween a light modulating material for controlling light transmission and scattering through voltage application, the light modulating material comprising a liquid crystal, a polymer, a near infrared- to infrared absorbing dye having a maximum absorption in the wavelength region of 700 nm or longer.

DETAILED DESCRIPTION OF THE INVENTION

Figure 1:
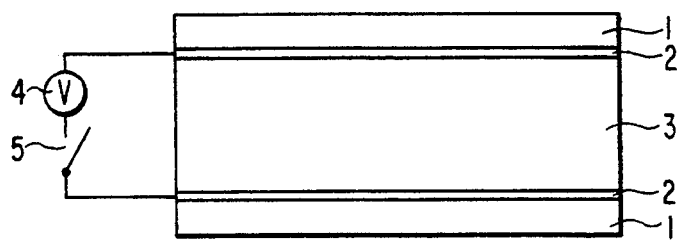
FIG. 1 shows a schematic cross section of a light modulating device according to one embodiment of the present invention.

The terminology "maximum absorption wavelength" as used herein means a wavelength as measured in a biphenyl type nematic liquid crystal.

The light modulating material (light controlling material) containing a liquid crystal and a polymer, which can be used in the present invention, may be prepared by, for example, any of the following processes (a) to (d):

(a) Impregnation process comprising impregnating a liquid crystal into a porous body of a polymer. A means for electrical field application is then attached thereto.

(b) Emulsion process comprising finely emulsifying a liquid crystal in an aqueous solution of a water-soluble polymer. The emulsion is then cast on an electrode substrate.

(c) Solvent casting process comprising dissolving a liquid crystal and a polymer in a common solvent. The solution is then cast on an electrode substrate.

(d) Polymerization process comprising preparing a uniform solution of a liquid crystal and a polymer precursor (the term "polymer precursor" means a substance to be polymerized, such as a prepolymer and a monomer) and carrying out polymerization to form a phase-separated structure. A means for electrical field application is then attached thereto.

Specific examples of the light controlling materials prepared by these processes are described, e.g., in WO-A-83-01016 (the term "WO-A" as used herein means "International laid-open patent publication") and WO-A-85-04262. Any of the materials disclosed in the publications may be employed in the present invention.

The dichroic dyes and/or the near infrared- to infrared-absorbing dichroic dye may be added in an appropriate step in each of the processes (a) to (d) above.

The thus prepared light controlling materials preferably contain from 5 to 95% by weight, and more preferably from 40 to 95% by weight of a liquid crystal.

Liquid crystals which can be used in the present invention are not particularly limited and include, for example, nematic liquid crystals, smectic liquid crystals, cholesteric liquid crystals, and mixtures thereof, with nematic liquid crystals being preferred. The liquid crystals to be used preferably have a high phase transition temperature from an isotropic liquid phase to a liquid crystal phase and a broad range of temperature for maintaining a liquid crystal phase and exhibits a liquid crystal phase in a stable manner.

Polymers which can be used for supporting the liquid crystal are not particularly limited as long as they are incompatible with the liquid crystal to be combined with. The polymer to be used can be so selected as to suit the preparation process selected from, for example, the above-described processes (a) to (d). Examples of suitable polymers include addition polymers of vinyl compounds, such as polyethylene, polyacrylic acid, polyacrylic esters, polyvinyl acetate, polyacrylonitrile, polyvinyl chloride, polyvinyl fluoride, polymethacrylic acid, polymethacrylic esters, polyvinylidene chloride, polyvinylidene fluoride, and polyvinylidene cyanide; copolymers of vinyl compounds or fluorine compounds, such as a vinylidene fluoride/trifluoroethylene copolymer, a vinylidene fluoride/tetrafluoroethylene copolymer, and a vinylidene cyanide/vinyl acetate copolymer; fluorine-containing polymers, such as polytrifluoroethylene, polytetrafluoroethylene, and polyhexafluoropropylene; polyamides, such as nylon 6 and nylon 66; polyimide; polyurethane; polypeptide; polyesters, such as polyethylene terephthalate; polycarbonate; polyethers, such as polyoxymethylene, polyethylene oxide, and polypropylene oxide; epoxy resins; polyvinyl alcohol; and polyvinyl butyral. These polymers may be used either individually or in combination of two or more thereof.

As the first aspect of the present invention, the light controlling material containing the above-mentioned liquid crystal and polymer further contains (A) at least one dichroic dye having a maximum absorption in the wavelength region of from 400 to 489 nm, (B) at least one dichroic dye having a maximum absorption in the wavelength region of from 490 to 559 nm, and (C) at least one dichroic dye having a maximum absorption in the wavelength region of from 560 to 699 nm.

The dichroic dyes (A), which assume a yellow tint, include anthraquinone dyes, azo dyes, and quinophthalone dyes. Specific examples of these dyes are described, e.g., in U.S. Pat. No. 4,985,171 and JP-A-58-141278. The dichroic dyes (B), which assume a red tint, include anthraquinone dyes and azo dyes. Specific examples of these dyes are described, e.g., in U.S. Pat. No. 4,610,804. The dichroic dyes (C), which assume a blue tint, include anthraquinone dyes and azo dyes. Specific examples of these dyes are described, e.g., in U.S. Pat. Nos. 5,026,505, 4,528,113, and 4,507,221.

With respect to the blue dichroic dyes (C) having a maximum absorption in the wavelength region of from 560 to 699 nm, it is preferable to use a combination of (C-1) a blue dichroic dye having a maximum absorption in the wavelength region of from 560 to 649 nm and (C-2) a blue dichroic dye having a maximum absorption in the wavelength region of from 650 to 699 nm. Such a combined use brings about more effective control on the transmission in the whole visible region. The blue dichroic dyes (C-1) and (C-2) can be chosen from, for example, those described in YUKI GOSEI KAGAKU KYOKAISHI (Journal of Organic Synthetic Chemistry Association), Vol. 49, No. 5, pp. 41–49 (1991) and compounds hereinafter shown.

The yellow dichroic dyes (A) are preferably selected from anthraquinone dyes represented by formula (I) and quinophthalone dyes represented by formula (II):

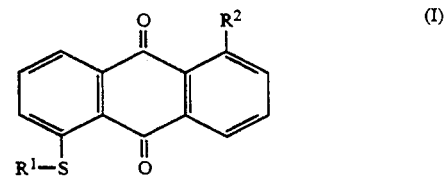
(I)

wherein $R^1$ and $R^2$ each represent

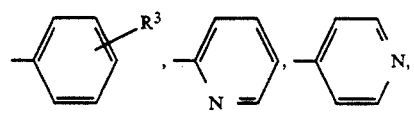

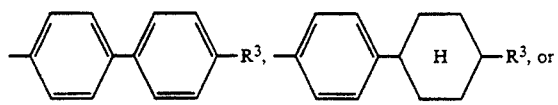

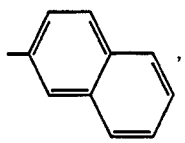

wherein $R^3$ represents a hydrogen atom, an alkyl group having from 1 to 8 carbon atoms, or an alkoxy group having from 1 to 8 carbon atoms.

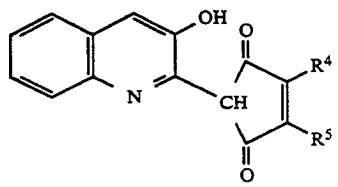

wherein $R^4$ and $R^5$ represent

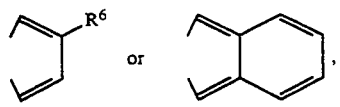

wherein $R^6$ represents a hydrogen atom or —COOR$^7$ (wherein $R^7$ represents an alkyl group having from 1 to 8 carbon atoms,

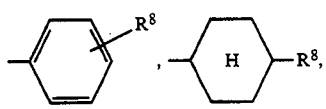

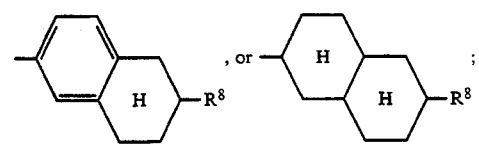

and $R^8$ has the same meaning as $R^3$ in formula (I)).

The red dichroic dyes (B) are preferably selected from anthraquinone dyes represented by formula (III) or (IV):

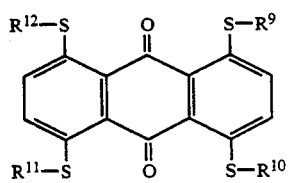

wherein $R^9$, $R^{10}$, $R^{11}$, and $R^{12}$ each have the same meaning as R or $R^2$ in formula (I).

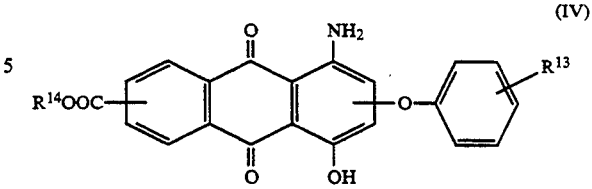

wherein $R^{13}$ has the same meaning as $R^3$ in formula (I); and $R^{14}$ represents an alkyl group having from 1 to 12 carbon atoms,

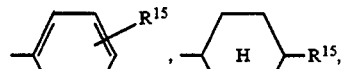

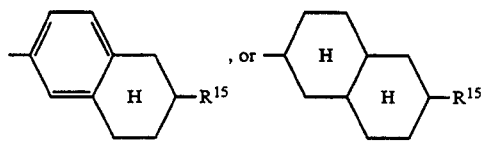

(wherein $R^{15}$ has the same meaning as $R^3$ in formula (I)).

The blue dichroic dyes (C) are preferably selected from anthraquinone dyes represented by formula (V), (VI) or (VII):

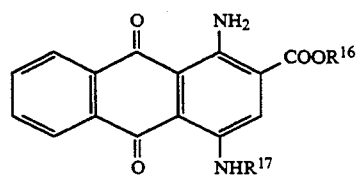

wherein $R^{16}$ has the same meaning as $R^{14}$ in formula (IV); and $R^{17}$ represents a hydrogen atom,

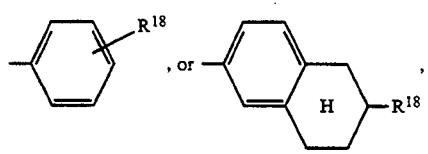

wherein $R^{18}$ has the same meaning as $R^3$ in formula (I).

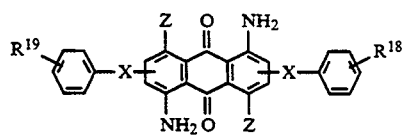

wherein $R^{19}$ has the same meaning as $R^3$ in formula (I); X represents an oxygen atom or a direct bond; and Z represents a hydroxyl group or an amino group.

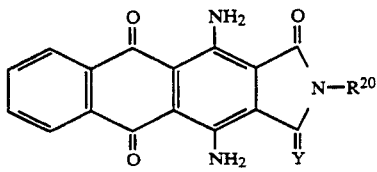 (VII)

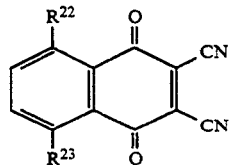 (VIII)

wherein R[20] represents an alkyl group having from 1 to 12 carbon atoms which may be substituted with an alkoxy group having from 1 to 8 carbon atoms, wherein R[22] and R[23] each represent an amino group or a substituted or unsubstituted arylamino group, provided that either one of R[22] and R[23] is a substituted or unsubstituted arylamino group.

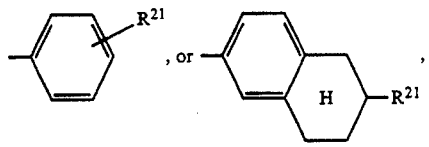

wherein R[21] has the same meaning as R[3] in formula (I); and Y represents an oxygen atom or an imino group.

The yellow dichroic dye (A) is generally used in an amount of from 0.1 to 9.0% by weight, and preferably from 0.5 to 4.5% by weight, based on the liquid crystal. The red dichroic dye (B) is generally used in an amount of from 0.1 to 6.0% by weight, and preferably from 0.5 to 3.0% by weight, based on the liquid crystal. The blue dichroic dye (C) is generally used in an amount of from 0.1 to 8.0% by weight, and preferably from 0.5 to 4.0% by weight, based on the liquid crystal. Where the blue dichroic dyes (C-1) and (C-2) are used in combination, the ratio of (C-1) to (C-2) generally ranges from 1/2 to 2/1.

Known liquid crystal compositions containing these dichroic dyes are disclosed in JP-A-1-252691.

In the light controlling material according to the present invention, the dichroic dyes (A) to (C) are supported by the liquid crystal phase or, in some cases, by the polymer phase. For instance, where the above-described process (a) is followed, most of the dichroic dyes are present in the liquid crystal phase. Where the process (b), (c) or (d) is followed, a part of the dichroic dyes is sometimes incorporated into the polymer phase.

As the second aspect of the present invention, the light controlling material containing the above-mentioned liquid crystal and polymer further contains (D) at least one near infrared- to infrared-absorbing dichroic dye having a maximum absorption in the wavelength region of 700 nm or longer. The liquid crystal and polymer to be used in this embodiment can be selected from those described above.

Examples of the near infrared- to infrared-absorbing dye (D) includes naphthoquinone dyes, anthraquinone dyes, squarylium dyes, phthalocyanine dyes, naphthalocyanine dyes, diimonium dyes, aminium dyes, cyanine dyes, and nickel complex compounds of dithiol derivatives. Specific examples of these dyes are described, e.g., in U.S. Pat. No. 5,037,525, JP-A-60-235886, JP-A-60-255853, JP-A-61-2756.

The near infrared- to infrared-absorbing dyes (D) are preferably selected from naphthoquinone dyes represented by formula (VIII), anthraquinone dyes represented by formula (IX), (X) or (XI), and squarylium dyes represented by formula (XII):

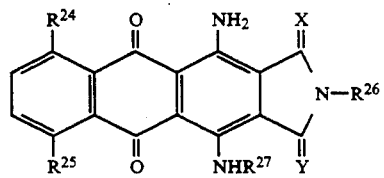 (IX)

wherein R[24] and R[25] represents a hydrogen atom, a halogen atom, a hydroxyl group, a nitro group, a substituted or unsubstituted alkyl group, or a substituted or unsubstituted aryl group; R[26] represents a hydrogen atom, a substituted or unsubstituted alkyl group, or a substituted or unsubstituted aryl group; R[27] represents a hydrogen atom or a substituted or unsubstituted alkyl group; and X and Y each represent an oxygen atom or a sulfur atom, provided that at least one of X and Y is a sulfur atom.

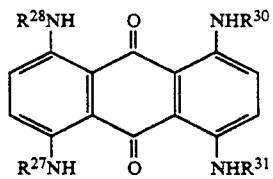 (X)

wherein R[28], R[29], R[30], and R[31] each represent a substituted or unsubstituted alkyl group or a substituted or unsubstituted aryl group.

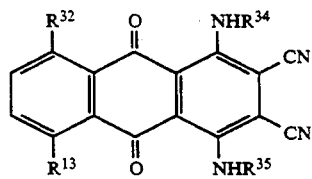 (XI)

wherein R[32] and R[33] each represent a hydrogen atom, a hydroxyl group, or a substituted or unsubstituted amino group; and R[34] and R[35] each represent a hydrogen atom, a substituted or unsubstituted alkyl group, or a substituted or unsubstituted aryl group, provided that at least one of R[34] and R[35] is a group other than a hydrogen atom.

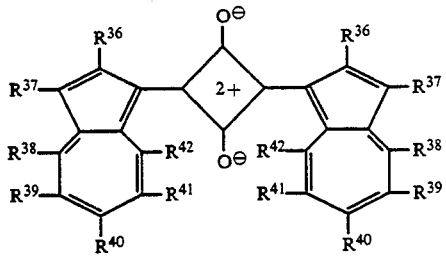

(XII)

wherein $R^{36}$, $R^{37}$, $R^{38}$, $R^{39}$, $R^{40}$, $R^{41}$, and $R^{42}$ each represent a monovalent organic group, e.g., a substituted or unsubstituted alkyl group; a pair of $R^{36}$ and $R^{37}$, a pair of $R^{37}$ and $R^{38}$, a pair of $R^{39}$ and $R^{40}$, a pair of $R^{40}$ and $R^{41}$, or a pair of $R^{41}$ and $R^{42}$ may be connected to each other to form a ring.

These near infrared- to infrared-absorbing dichroic dyes (D) may be used either individually or in combination of two or more thereof. They are generally used in an amount of from 0.1 to 10% by weight, and preferably from 0.2 to 5.0% by weight, based on the liquid crystal.

In a preferred embodiment of the present invention, the dichroic dyes (A), (B), and (C) according to the first aspect and the near infrared- to infrared-absorbing dichroic dye (D) according to the second aspect are both incorporated into the light controlling material.

If desired, the light controlling material of the present invention may further contain other additives, such as stabilizers including surface active agents, ultraviolet absorbents, and antioxidants; chain transfer agents, photosensitizers, and crosslinking agents.

The light modulating device according to the present invention is produced by supporting the above-mentioned light controlling material between a pair of electrode substrates each having on the inner side thereof an electrode, preferably a transparent electrode.

Electrodes to be used include transparent electrodes made of metallic oxides, such as indium-tin oxide (ITO). Substrates to be used include transparent plates made of glass or plastics, such as polyesters.

Where the light modulating device of the present invention is applied to control of sunlight containing about 50% of near infrared to infrared light, effective sunlight control may be achieved by using an infrared reflecting electrode on one or both of the two substrates. In this case, infrared light transmission can be controlled more effectively by using an infrared reflecting electrode on only one of the substrates while using a transparent electrode having no infrared reflecting properties on the other substrate. The above-described transparent electrode of metallic oxides, e.g., ITO, may be used as an electrode with no infrared reflecting function. The electrode substrate to be used include transparent plates made of glass or plastics, e.g., polyesters.

Examples of the electrode having infrared reflecting properties include (1) a thin film made of at least one metal selected from the group consisting of gold, silver, copper, palladium and aluminum or a laminate film thereof, (2) a laminate film composed of an ITO thin film and a thin film made of at least one metal selected from the group consisting of gold, silver, copper, palladium and aluminum (a laminate film composed of an ITO thin film having thereon a gold thin film is preferred), and (3) a composite laminate film composed of at least 3 layers, in which (3-1) a thin film made of at least one metal selected from the group consisting of gold, silver, copper, palladium and aluminum or a laminate film thereof and (3-2) a dielectric thin film made of, e.g., an oxide and/or a sulfide of at least one metal selected from the group consisting of titanium, bismuth, indium, tin, cerium, tantalum, tungsten, molybdenum, erbium, hafnium, zinc, yttrium, zirconium, silicon, antimony, lead, scandium, and aluminum alternate with each other.

Typical examples of the layer structures of the composite laminate film (3) include $TiO_2/Ag/TiO_2$, $Bi_2O_3/Au/Bi_2O_3$, $SiO_2/Au/SiO_2$, $SiO_2/Ag/SiO_2$, $SnO_2/Cu/SnO_2$, $In_2O_3/Au\cdot Ag/In_2O_3$, $In_2O_3/Ag\cdot Cu/In_2O_3$, $TiO_2/Ag\cdot Cu/TiO_2$, $ITO/Ag/ITO$, $ITO/Ag/TiO_2$, $ZrO_2/Ag/ZrO_2$, $ZnS/Ag/ZnS$, $Ag/TiO_2/Ag$, $Au/Bi_2O_3/Au$, $Au/SiO_2/Au$, $Ag/SiO_2/Ag$, $Ag/ITO/Ag$, $Ag/ZnS/Ag$, and $TiO_2/Ag/TiO_2/Ag$. Preferred of them are $TiO_2/Ag/TiO_2$, $SnO_2/Cu/SnO_2$, and $In_2O_3/Au\cdot Ag/In_2O_3$.

In addition, a composite laminate film composed of a silver thin film and a dielectric thin film made of $Na_3AlF_6$, e.g., $Ag/Na_3AlF_6/Ag$ or $Ag/Na_3AlF_6/Ag/Na_3AlF_6/Ag$, and a laminate film composed of two or more of the dielectric thin films described in (3) above may also be used as an infrared reflecting electrode.

The metallic thin film in the electrodes (1) to (3) can be formed by vacuum evaporation or sputtering. The metallic thin film preferably has a thickness of from 20 to 1,000 Å, and particularly from 50 to 300 Å. The metal oxide thin film or dielectric thin film used in the electrode (2) or (3) and the metal oxide thin film used in the above-described transparent electrode can be formed by vacuum evaporation, sputtering, or chemical coating. These films preferably have a thickness of from 20 to 1,000 Å, and particularly from 50 to 500 Å.

An electrode substrate having thereon a transparent electrode made of a metal oxide (such as ITO) and having laminated on the electrode side and/or substrate side thereof the infrared reflecting electrode (1), (2) or (3) may also be used. In this case, the infrared reflecting electrode is preferably laminated on the electrode side. If it is laminated on the substrate side, there would be a necessity to provide a protective film on the infrared reflecting electrode for assuring durability, such as scratch resistance. When a protective film should be provided, an organic film of acrylic resins, polyacrylonitrile, polypropylene, polyimide, etc. or a metal oxide film made of one or more of titanium oxide, silica, alumina, etc. may be formed.

The light modulating device according to the present invention may further comprises a spacer to keep the thickness of the light controlling material layer constant. Examples of the spacer include spherical materials, such as polymer particles (e.g., polydivinylbenzene) and inorganic particles (e.g., alumina), rod-shaped materials, such as glass fibers.

The light modulating device according to the present invention comprising a pair of transparent electrode substrates is applicable as a transmission type light modulating device. Alternatively, the element comprising a transparent electrode substrate and an opaque electrode substrate is made applicable as a reflection type light modulating device by placing a reflecting layer on the back of the opaque electrode substrate.

The thickness of the light controlling material layer is generally from 1 to 50 μm, and preferably from 5 to 20 μm.

The light controlling material containing a liquid crystal and a polymer which can be used in the present invention exhibits excellent film forming properties to provide a uniform film The light controlling material according to the first embodiment of the present invention, which further contains three kinds of dichroic dyes having absorptions over the wavelength region of from 400 to 699 nm, has a controllable light transmission over the wavelength region of from visible region through infrared region and creates a comfortable environment in cars or rooms. When used in a display, the light modulating device of the invention exhibits remarkable light screening properties with no voltage applied, while exhibiting high light transmission properties with a voltage applied, making an extremely high display contrast A light modulating device that is more effective to control infrared light can be produced by using a near infrared- to infrared-absorbing dichroic dye having a maximum absorption wavelength region of 700 nm or more.

The structure of one embodiment of the present invention can be seen in FIG. 1, in which the embodiment comprises a pair of electrode substrates 1 each having an electrode 2 on the inner side thereof and having supported therebetween a light controlling material 3 for controlling light transmission and scattering through voltage application from electric power source 4 when switch 5 is closed.

Figure 2:
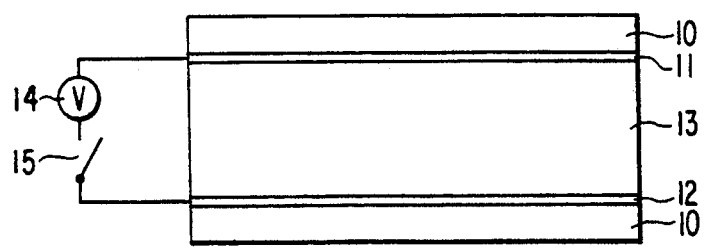
FIG. 2 shows a schematic cross section of a light modulating device according to another embodiment of the present invention.

The structure of another embodiment of the present invention can be seen in FIG. 2, in which the embodiment comprises a pair of electrode substrates 10, one of which has an electrode 11 on the inner side thereof and the other of which has an infrared reflecting electrode 12 on the inner side thereof, having supported therebetween a light controlling material 13 for controlling light transmission and scattering through voltage application from electric power source 14 when switch 15 is closed.

The present invention is now illustrated in greater detail by way of Examples, but it should be understood that the present invention is not deemed to be limited thereto.

EXAMPLE 1

A 250 Å thick ITO film was formed by sputtering on a 125 μm thick polyethylene terephthalate film to prepare a transparent electrode substrate.

Separately, a solution was prepared, consisting of 0.5 g of trimethylolpropane triacrylate, 1.0 g of n-butyl acrylate, 3.5 g of a commercially available biphenyl type nematic liquid crystal ("E-8" produced by BDH Co.), 0.03 g of 2,2-dimethoxy-2-phenylacetophenone as a polymerization initiator, and the following four kinds of dichroic dyes of the respective amount shown. To the solution was added 0.08 g of a spacer made of a divinylbenzene copolymer (diameter: 10 μm) to prepare a liquid crystal composition.

Yellow Dichroic Dye:  0.053 g

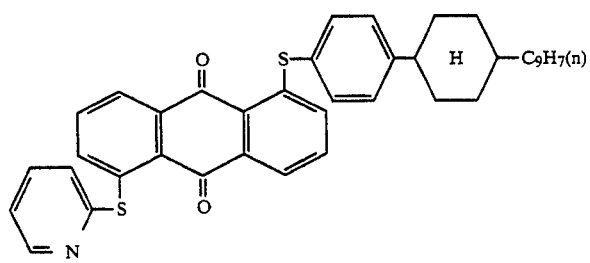

$\lambda_{max}$ = 461 nm

Red Dichroic Dye:  0.035 g

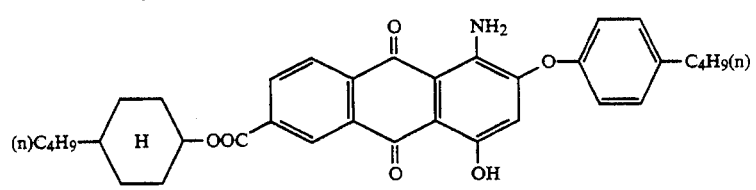

$\lambda_{max}$ = 534 nm

Blue Dichroic Dye:  0.018 g

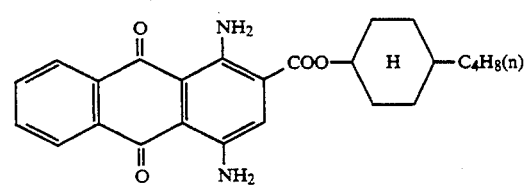

$\lambda_{max}$ = 638 nm

Blue Dichroic Dye:

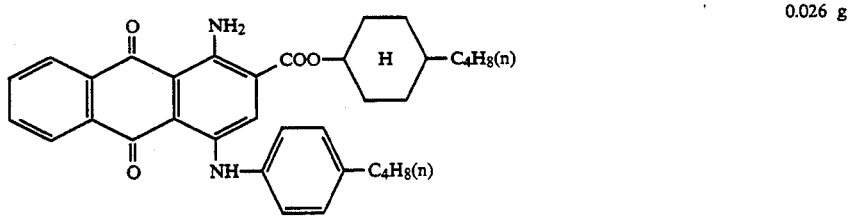

0.026 g $\lambda_{max} = 668$ nm

The resulting liquid crystal composition was filled between a pair of the above-prepared transparent electrode substrates, assembled with their ITO films facing to each other, and then exposed to light by means of an ultraviolet emitter to obtain a uniform light modulating device free from cracks, etc. The energy of UV exposure corresponded to 800 mJ.

A sunlight transmission (JIS R3106) and a visible light transmission (JIS R3106) of the resulting light modulating device were measured in the "off" state (with no voltage applied) and the "on" state (with an alternating voltage of 100 V, 60 Hz, sinusoidal wave applied). The results obtained are shown in Table 1 below.

EXAMPLE 2

A 250 Å thick ITO film was formed by sputtering on a 125 ||m thick polyethylene terephthalate film, and on the ITO film was further laminated a 75 μm thick gold film by vacuum evaporation to prepare an infrared reflecting electrode substrate.

A liquid crystal composition prepared in the same manner as in Example 1 was filled between the above prepared infrared reflecting electrode substrate and a transparent ITO substrate prepared in the same manner as in Example 1, assembled with the gold film and the ITO film facing to each other, and UV exposed in the same manner as in Example 1 to obtain a light modulating device.

Optical characteristics of the resulting light modulating device were determined in the same manner as in Example 1. The results obtained are shown in Table 1.

COMPARATIVE EXAMPLE 1

A light modulating device was prepared in the same manner as in Example 1, except for using no dichroic dye.

Optical characteristics of the resulting light modulating device were determined in the same manner as in Example 1. The results obtained are shown in Table 1.

COMPARATIVE EXAMPLE 2

A light modulating device was prepared in the same manner as in Example 2, except for using no dichroic dye.

Optical characteristics of the resulting light modulating device were determined in the same manner as in Example 1. The results obtained are shown in Table 1.

TABLE 1

| Example No. | Sunlight Transmission | | | Visible Light Transmission | | |
|---|---|---|---|---|---|---|
| | Off (%) | On (%) | On/Off | Off (%) | On (%) | On/Off |
| Example 1 | 69 | 78 | 1.13 | 57 | 72 | 1.26 |
| Example 2 | 40 | 47 | 1.18 | 44 | 57 | 1.30 |
| Comparative Example 1 | 78 | 83 | 1.06 | 77 | 82 | 1.06 |
| Comparative Example 2 | 45 | 49 | 1.08 | 58 | 64 | 1.10 |

As is apparent from Table 1, the light modulating devices of the present invention have a high on/off ratio both of sunlight transmission and visible light transmission and are thus proved extremely effective in controlling over the whole region of sunlight including visible light and heat rays.

EXAMPLE 3

In a mixed solvent of 0.96 g of tetrahydrofuran and 0.64 g of 1,4-dioxane were added 0.16 g of polymethyl methacrylate (hereinafter abbreviated as PMMA, molecular weight: 95000), 0.24 g of a commercially available biphenyl type nematic liquid crystal ("E-44" produced by BDH Co.), and 0.02 g of a naphthoquinone near infrared-absorbing dichroic dye ($\lambda_{max}$780 nm) represented by formula shown below to prepare a uniform liquid crystal composition.

Near Infrared Absorbing Dye:

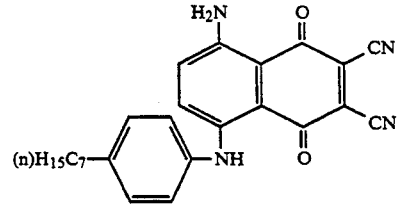

The composition was cast on an ITO film formed on a polyethylene terephthalate substrate by means of an applicator to a dry thickness of 8 μm and then dried at 80° C. for 30 minutes. Another polyethylene terephthalate substrate having an ITO electrode was bonded to the cured layer under a pressure of 5 kg/cm² to prepare a light modulating device.

The sunlight transmissions of the resulting light modulating device in the "off" state and the "on" state, measured in the same manner as in Example 1, were found to be 65% and 70%, respectively, indicating capability of controlling sunlight transmission.

EXAMPLE 4

In a mixture of 0.16 g of the same PMMA as used in Example 3 and 0.24 g of liquid crystal E-44, an anthraquinone near infrared-absorbing dichroic dye of formula shown below ($\lambda_{max}=760$ nm) was dissolved to saturation. The resulting solution was added to a mixed solvent of 0.96 g of tetrahydrofuran and 0.64 g of 1,4-dioxane to prepare a uniform liquid crystal composition.

Near Infrared Absorbing Dye:

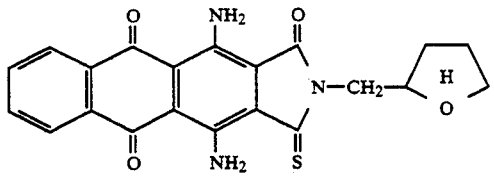

A light modulating device was prepared in the same manner as in Example 3, except for using the above prepared composition as a light controlling material.

The resulting light modulating device had a sunlight transmission of 67% in its "off" state and of 73% in its "on" state as measured in the same manner as in Example 1, thus proving capable of control on sunlight transmission.

EXAMPLE 5

In a mixed solvent of 0.96 g of tetrahydrofuran and 0.64 g of 1,4-dioxane were dissolved 0.16 g of the same PMMA as used in Example 3 and 0.24 g of liquid crystal E-44, and 0.0008 g of a squarylium near infrared-absorbing dichroic dye of formula shown below ($\lambda_{max}=780$ nm) to prepare a uniform liquid crystal composition.

Near Infrared-absorbing dichroic dye:

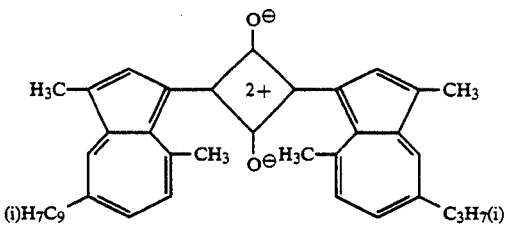

A light modulating device was prepared in the same manner as in Example 3, except for using the above prepared liquid crystal composition as a light controlling material.

The resulting light modulating device had a sunlight transmission of 74% in its "off" state and of 76% in its "on" state as measured in the same manner as in Example 3, thus proving capable of control on sunlight transmission.

EXAMPLE 6

In a mixed solvent of 9.6 g of tetrahyrofuran and 6.4 g of 1,4-dioxane were dissolved 1.6 g of the same PMMA as used in Example 3, 2.4 g of liquid crystal E-44, 0.006 g of the same squarylium near infrared-absorbing dichroic dye as used in Example 5, and the following four kinds of dichroic dyes of the respective amount shown to prepare a uniform liquid crystal composition.

Yellow Dichroic Dye: 0.026 g

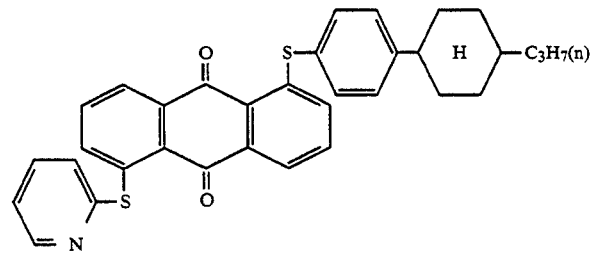

$\lambda_{max} = 461$ nm

Red Dichroic Dye: 0.017 g

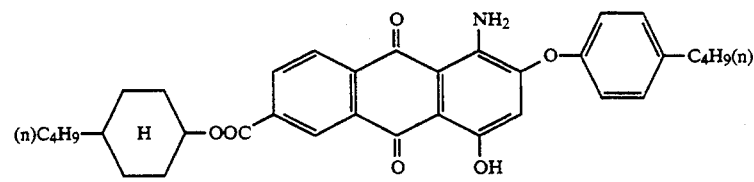

$\lambda_{max} = 534$ nm

Blue Dichroic Dye: 0.009 g

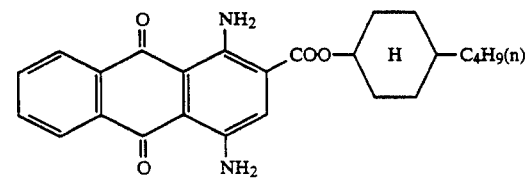

$\lambda_{max} = 638$ nm

-continued

Blue Dichroic Dye:  0.013 g

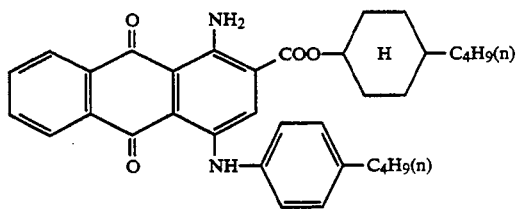

$\lambda_{max} = 668$ nm

A light modulating device was prepared in the same manner as in Example 3, except for using the above prepared composition as a light controlling material.

The resulting light controlling element had a sunlight transmission of 50% in its "off" state and of 55% in its "on" state as measured in the same manner as in Example 1, thus proving capable of control on sunlight transmission.

As described and demonstrated above, the light controlling element according to the present invention has excellent capability of controlling transmission of visible to infrared light (sunlight) and is therefore very useful in industry as a high performance light modulating device of light modulating windows, display devices, and so on.

While the invention has been described in detail and with reference to specific examples thereof, it will be apparent to one skilled in the art that various change and modifications can be made therein without departing from the spirit and scope thereof.

What is claimed is:

1. A light modulating device comprising a pair of electrode substrates each having an electrode on the inner side thereof and having supported therebetween a light modulating material for controlling light transmission and scattering through voltage application, said light modulating material comprising a liquid crystal, a polymer, a dichroic dye having a maximum absorption in the wavelength region of from 400 to 489 nm, a dichroic dye having a maximum absorption in the wavelength region of from 490 to 559 nm, and a dichroic dye having a maximum absorption in the wavelength region of from 560 to 699 nm.

2. A light modulating device as claimed in claim 1, wherein at least one of the electrode substrates is a substrate having an infrared reflecting electrode.

3. A light modulating device as claimed in claim 1, wherein said dichroic dye having a maximum absorption in the wavelength region of from 560 to 699 nm comprises a dichroic dye having a maximum absorption in the wavelength region of from 560 to 649 nm and a dichroic dye having a maximum absorption in the wavelength region of from 650 to 699 nm.

4. A light modulating device as claimed in claim 1, wherein said dichroic dye having a maximum absorption in the wavelength region of from 400 to 489 nm is present in an amount of from 0.1 to 9.0% by weight, a dichroic dye having a maximum absorption in the wavelength region of from 490 to 559 nm is present in an amount of from 0.1 to 6.0% by weight, and a dichroic dye having a maximum absorption in the wavelength region of from 560 to 699 nm is present in an amount of from 0.1 to 8.0% by weight, each based on the liquid crystal.

5. A light modulating device as claimed in claim 1, wherein said light modulating material further contains at least one near infrared- to infrared-absorbing dichroic dye having a maximum absorption in the wavelength region of 700 nm or more.

6. A light modulating device as claimed in claim 5, wherein said near infrared- to infrared-absorbing dichroic dye is present in an amount of from 0.1 to 10% by weight based on the liquid crystal.

* * * * *